J. C. MORIN & F. M. REED.
APPARATUS FOR IMPREGNATING POSTS.
APPLICATION FILED OCT. 29, 1909.
955,422.
Patented Apr. 19, 1910.
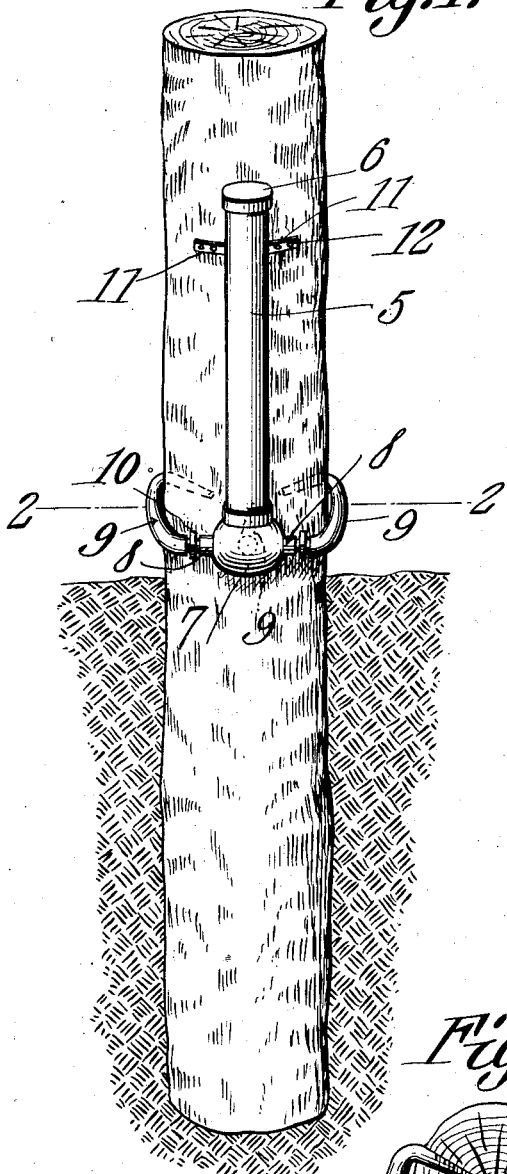
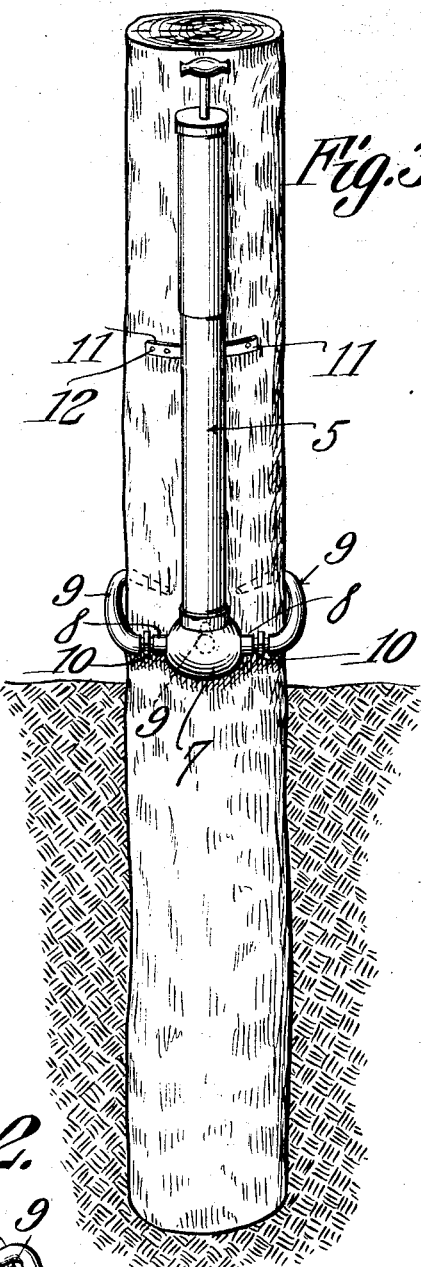
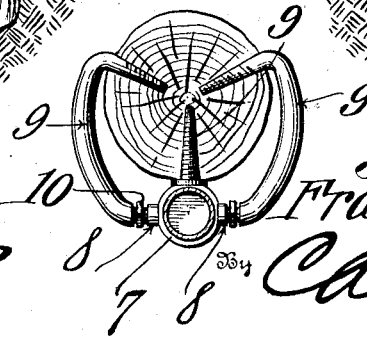

UNITED STATES PATENT OFFICE.

JOHN C. MORIN AND FRANKLIN M. REED, OF BROOKVILLE, INDIANA, ASSIGNORS OF ONE-THIRD TO ROBERT H. COOK, OF BROOKVILLE, INDIANA.

APPARATUS FOR IMPREGNATING POSTS.

955,422.     Specification of Letters Patent.     Patented Apr. 19, 1910.

Application filed October 29, 1909. Serial No. 525,349.

*To all whom it may concern:*

Be it known that we, JOHN C. MORIN and FRANKLIN M. REED, citizens of the United States, residing at Brookville, in the county of Franklin, State of Indiana, have invented a new and useful Apparatus for Impregnating Posts, of which the following is a specification.

This invention relates to an apparatus for impregnating wood with a preservative fluid such as, for instance, creosote, for the purpose of preventing decay.

The invention is designed more particularly for the treatment of standing telegraph, telephone, electric railway, and other posts and poles, and it has for its object to provide a novel form of apparatus for this purpose.

The apparatus consists of a reservoir containing the preservative fluid, said reservoir being mounted on the post, and having outlets which enter the same, and carry the fluid thereinto.

The invention also has for its object to provide an apparatus which can be readily applied to any portion of the post, so that the latter may be treated at and below the ground line, where decay first takes place.

Another object of the invention is to provide an apparatus by which the preservative fluid may be applied by absorption, or forcibly injected into the post by a pump.

The apparatus is illustrated in the accompanying drawing forming a part of this specification in which, Figure 1 is a perspective view showing the apparatus in position on the post. Fig. 2 is a horizontal section on the line 2—2 of Fig. 1. Fig. 3 is a perspective view showing a modification.

Referring to the drawing, 5 denotes the reservoir containing the preservative fluid. The reservoir is in the form of a tube closed at its upper end by a screw cap 6, or other suitable closure. The lower end of the tube screws into a hollow head 7 having nipples 8 for connection of delivery pipes 9. One of these pipes is adapted to be screwed about one inch into a hole entering the heart or center of the post. The other two pipes extend in a curve from opposite ends of the head, and partly encircle the post, their discharge ends being screwed thereinto. The two last-mentioned pipes are connected by unions 10 to the nipples 8 after being screwed into the post. The reservoir is formed at its upper end with ears 11 having perforations to receive fastening means 12, which, upon being driven into the post, securely fasten the reservoir thereto. The delivery pipes also serve to hold the reservoir in position on the post.

In use, the apparatus is mounted on the post to be treated, as herein described, the reservoir being vertically disposed, and filled with the preservative fluid, and closed by the cap 6. The fluid will be absorbed by the post, and after the reservoir is emptied, it may be refilled if necessary.

The apparatus can be placed near the ground line, so that this portion of the post can be treated without treating the entire post, thereby lessening the cost of the treatment. Ordinarily, treatment of the post at and below the ground line is sufficient as the decay takes place first at this point. If it is desired to treat the post for some distance above the ground, the apparatus may be moved higher up on the post. It can be readily mounted on any portion of the post.
Instead of the slow absorbent method of treatment, the fluid may be forcibly injected into the post, by removing the cap 6, and attaching a pump to the upper end of the reservoir 5 as shown in Fig. 3. This method will be employed if it is desired to quickly treat the post.

The fluid is carried to the center or heart of the post by the delivery pipes 9, and the flow is therefore outwardly, instead of inwardly, thus avoiding the resistance which is offered the inward flow of the liquid when it is forced into the post from the outside thereof.

It is an evident fact, that seasoned posts, after being set in the ground for some time, will, in wet weather, become water soaked. Now, applying the apparatus in the manner described, the preservative fluid, being of a more penetrating character, and of greater specific gravity, and insoluble in water, will drive the water and moisture out of the post, and saturate it to the bottom, and also a short distance above the level of the reservoir.

The apparatus is simple in structure, easily applied, and economical in operation. It can be applied to any sized post, and it is not necessary to remove the cross arms or disturb the service in any way. After the post is thoroughly saturated, the reservoir can be removed, and used on another post; or it may become a permanent fixture, to be refilled from time to time.

By treating the post as herein described, the cells of the wood are left in their natural state, and the natural strength of the post is therefore not reduced, as is the case where the post is subjected to the boiling, suction, or compressed air method.

What is claimed is:

An apparatus for impregnating standing wooden posts with a preservative fluid, comprising a reservoir mounted on the post, a distributing head connected to the reservoir, nipples on said head, and a plurality of delivery pipes connected to the head, and extending into the post, a pair of said pipes extending in opposite directions from the distributing head, and partly encircling the post, and coupling devices for connecting the last-mentioned pipe to the nipples.

In testimony that we claim the foregoing as our own, we have hereto affixed our signatures in the presence of two witnesses.

JOHN C. MORIN.
FRANKLIN M. REED.

Witnesses:
Jos. Smith,
Robert H. Cook.